United States Patent [19]

McKenzie

[11] 4,213,728

[45] Jul. 22, 1980

[54] CONTAINER LIFTER

[76] Inventor: Geoffrey F. McKenzie, Box No. 271, P.O., Rabaul, Papua New Guinea

[21] Appl. No.: 902,856

[22] Filed: May 4, 1978

Related U.S. Application Data

[63] Continuation-in-part of Ser. No. 626,925, Oct. 29, 1975, abandoned.

[30] Foreign Application Priority Data

Oct. 31, 1974 [AU] Australia .............................. PB9447

[51] Int. Cl.[3] ............................................. B62B 1/06

[52] U.S. Cl. .................................... 414/446; 414/447; 414/460

[58] Field of Search ............... 414/460, 461, 498, 607, 414/786, 444, 446, 447; 294/67 R

[56] References Cited

U.S. PATENT DOCUMENTS

| | | | |
|---|---|---|---|
| 3,554,394 | 1/1971 | Hedman | 414/458 |
| 3,749,438 | 7/1973 | Loomis et al. | 294/67 R |

FOREIGN PATENT DOCUMENTS

| | | | |
|---|---|---|---|
| 1957726 | 11/1970 | Fed. Rep. of Germany | 414/458 |

*Primary Examiner*—Robert G. Sheridan
*Attorney, Agent, or Firm*—Fleit & Jacobson

[57] ABSTRACT

This invention describes a container lifter which is economical where only occasional deliveries occur and the use of machines such as heavy fork lift or a straddle truck is unwarranted.

The container lifter has an open U-shape chassis which is provided with two sliding rams at each end, each ram having a chain preferably of alloy steel construction, the chains being attached to twist locks which are adapted to fit into the bottom corners of a container.

In a modification, the container lifter is provided with a second set of rams, the second set being mounted on arches above the frames so as to enable the container to be lifted to such a height that it can be placed on a truck.

3 Claims, 8 Drawing Figures

FIG. 1
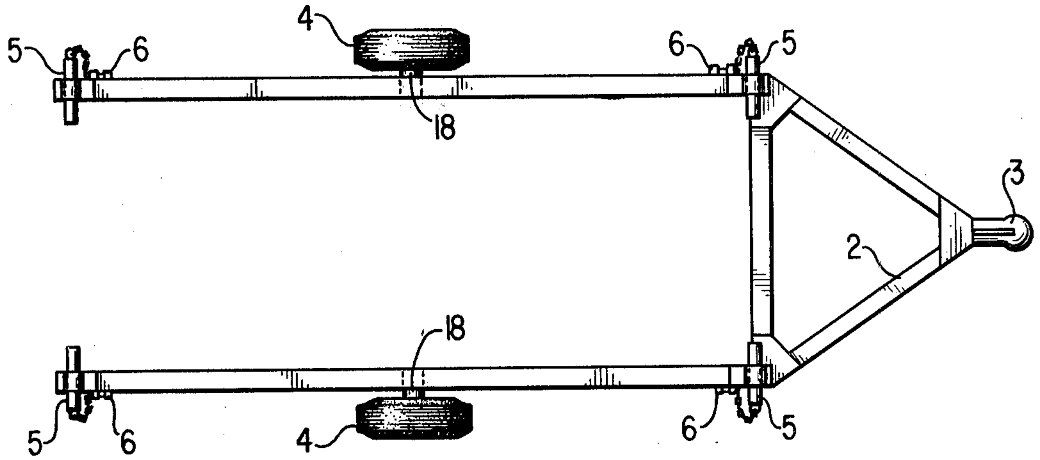
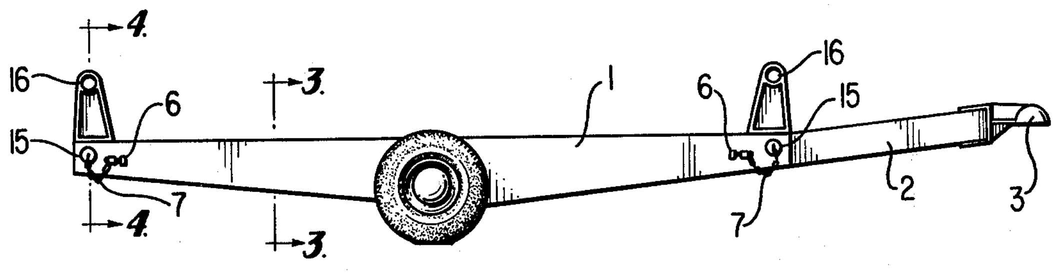
FIG. 2
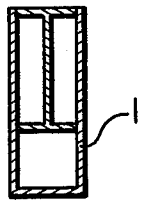
FIG. 3
FIG. 4
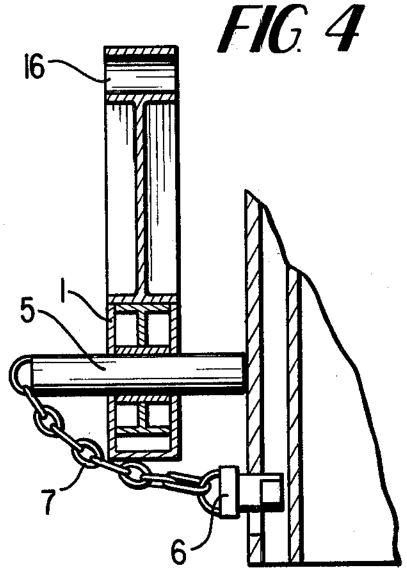

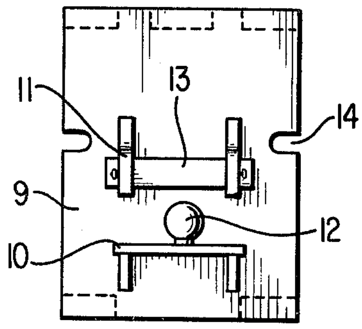
FIG. 5
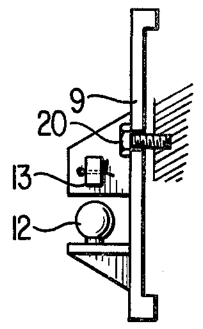
FIG. 6
FIG. 7
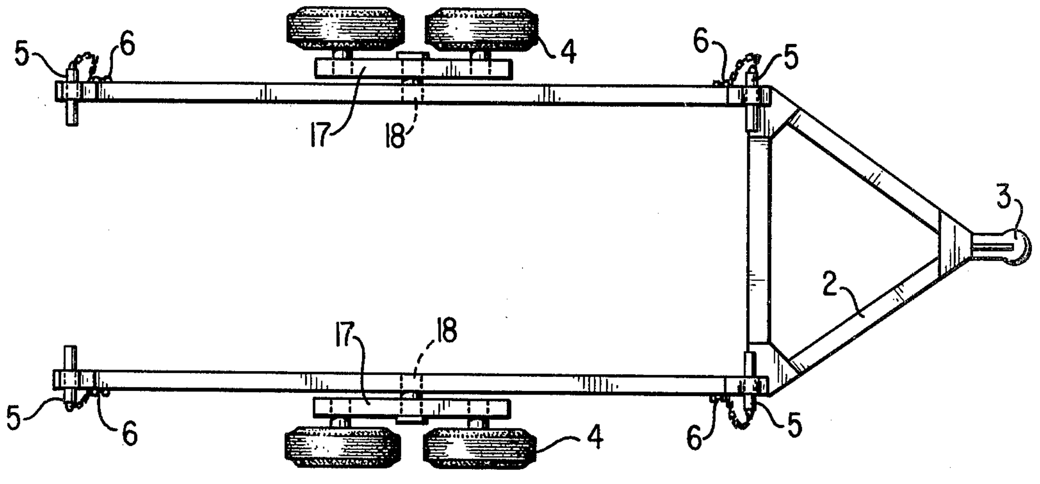
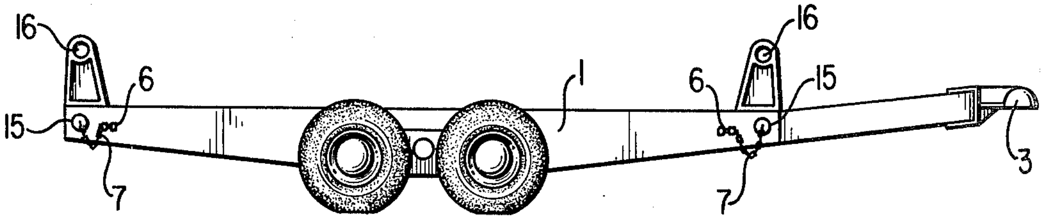
FIG. 8

CONTAINER LIFTER

CROSS-REFERENCES TO RELATED APPLICATIONS

This application is a continuation-in-part of my co-pending application Ser. No. 626,925 filed Oct. 29, 1975 now abandoned.

This invention relates to a method and means for use in lifting and conveying containers.

Transport of goods by land and air in bulk containers has increased considerably in recent years. Amongst the early systems used in sea transport was the Matson system which introduced containers 8′×8½′×24′ with special corner fittings, latching devices and lifting beams.

About the same time, Grace Lines converted two ships for use in container transport, using 8′×8′×17′ containers and different type of latching and lifting system from the Matson type. The railroads also developed their own system of containerisation, probably to meet increased competition from the road trucking industry.

Accordingly the need for standardisation of sizes of containers became obvious, and in late 1965 the International Organization for Standardisation (I.S.O.) broadly adopted the American Standards Association standards for containers. Even though many of the non-standard container systems remain in use, the I.S.O. standard containers are being used increasingly for multipurpose freight transportation.

One result of the greater usage of containers has been an increase in the requirements for improved wharf handling facilities, and a need to strengthen the wharf area and environs because of the heavy loads traversing them. This is, of course, an economic proposition in large ports such as Tokyo, Amsterdam and Sydney but is not so in smaller ports such as many of the Pacific Island ports which do not handle large quantities of goods and thus do not warrant great expenditure on the port facilities to enable them to economically handle container transport.

BACKGROUND OF THE INVENTION

Some of the machines used in lifting and conveying cargo containers are described in a recent article, May 1975, in Containerisation International at page 43 et seq. The article written by David R. Lauder of Containerbases Ltd. discusses the advantages and disadvantages of a number of machines and comments on the best applications of each type.

Amongst the machines discussed are:

Rail Mounted Gantry Cranes

These are large machines, usually electrically powered but because of their installation costs (including civil works) are only economical in extremely busy operations.

Diesel Powered, Mobile Gantry Cranes

These machines are rubber tyred highly manoeuvrable with an ability to operate over tracks transferring to vehicles, or as stacking machines. The driver's vision is somewhat limited and the machines are quite expensive.

Diesel Powered Sideloaders

These were amongst the first machines introduced in container handling but have inherent design problems caused by the conflicting requirements of counterbalancing an outreached load by a chassis which must be kept as narrow as possible.

Diesel Powered Straddle Carriers

These have become the most common type of machine in large and medium sized terminals. They need to be kept in almost continuous operation in order to be economical.

Front End Loaders

Large fork trucks fitted with automatic or telescopic spreaders can be used for all types of containers. Where there is sufficient volume of traffic these machines have been used for moving empty containers—however even in these cases the fork truck has about a ten ton basic capacity.

Jib or Derrick Cranes

These are often used on smaller terminals for ship to shore movement but their operation is very limited since corner locks must be inserted manually and control of load rotation is by handline.

All of the above machines are extremely expensive and in general require a busy terminal in order to be economical and because of their size and weight associated civil works are costly.

It is apparent that a need exists for a cheaper type of container lifter, especially where traffic is not dense.

In U.S. Pat. No. 3,749,438 to Loomis et al. granted July 31, 1973 there is described a universal twistlock to accept odd sized container corner castings for a top lift spreading device, operated by hydraulic rams. The twistlocks of the Loomis et al. patent are for lifting from the top four corners, are useful only in conjunction with a lifting beam and are not suitable for lifting from the bottom four corners of a container.

U.S. Pat. No. 3,554,394 to Hedman granted Jan. 12, 1971 describes a trailer primarily designed for use with boats. The trailer is not an open ended U frame and has a support stock across the rear end. The trailer is relatively complicated in design and is time consuming in use.

German patent application number 1,957,726 filed Nov. 17, 1969 and now abandoned describes a load carrier for lifting containers and has two longitudinally extending arms which have located at each corner a movable stud means and have located transversely and off center of the arms a roller means. This device requires a very high capacity fork lift truck or other expensive power unit and is unworkable except with the addition of a very heavy counter weight which needs to be placed on the front of the carrier to permit the rear lift to be carried out.

Thus it is an object of this invention to provide a container lifter which is economical where only occasional deliveries occur and the use of machines such as heavy fork lift or a straddle truck is unwarranted.

A further object is to provide a container lifter which is capable of moving in conjunction with a small prime mover such as a 3 to 4 ton fork lift trucker, containers from the quayside to a shed.

A still further object is the provision of a lifter provided with arches whereby the container may be lifted onto a truck.

In essence the container lifter has a U-shape chassis which is provided with two sliding rams at each end, each said ram having a chain preferably of alloy steel construction, the said chains being attached to means (such as a twist lock), the said means being adapted to fit into the bottom corners of a container. The container lifter is provided with a towing device such as a ball and cup so as to be secured to a fork lift which has had the tines removed and is fitted with a plate attachment to lock the lifter in place and also to prevent up and down movement of the lifter.

In a modification, the container lifter is provided with a second set of rams the said second set being mounted on arches above the frame so as to enable the container to be lifted to such a height that it can be placed on a truck.

The invention also embraces the method of lifting the container onto the chassis and onto the further modified chassis. Essentially the method in both instances is a see-saw method.

DETAILS OF THE PREFERRED EMBODIMENTS

The foregoing and other details of the invention will be better understood by reference to the accompanying drawings of preferred embodiments of the invention in conjunction with the associated description. It is emphasised that the drawings are diagrammatic only and are not intended to be limitative of the broad scope of the invention.

In the drawings:

FIG. 1 is a plan view of the container lifter

FIG. 2 is a side view of the lifter

FIG. 3 is a sectional view of the body taken through 3—3 of of FIG. 2 and showing the box section FIG. 4 is a sectional view taken through 4—4 of FIG. 2 and showing the securing arrangement FIG. 5 is an elevation of the towing attachment (for connection to a fork lift or other suitable conveyance)

FIG. 6 is a side view of the towing attachment of FIG. 5

FIG. 7 is a view of the container lifter provided with twin wheels and otherwise is the same as FIG. 1, and FIG. 8 is a side view of the lifter of FIG. 7.

DETAILED DESCRIPTION OF THE PREFERRED EMBODIMENT

Referring now to the figures, a box section is shown at 1 comprising longitudinally arranged members which have affixed to one end a tow bar 2 having an interface for towing, such as a ball joint 3. The trailer box section 1 also utilizes two wheels shown generally at 4 which are located substantially at the mid-points of the trailer box section 1. Located at either end of the box section 1 are lower sliding rams or sliding buffers 5 which have lifting dogs 6 attached thereto by some suitable means. In the preferred embodiment shown, the lifting dogs 6 are attached to the sliding rams by lifting chains 7.

As illustrated in FIG. 4 of the drawings, the buffer 5 has one end engaged with the side of the container and a free end connected to a chain 7. The other end of the chain 7 is connected to a lifting dog 6 inserted into a lower portion of a container. When a container is raised, the lifting dog 6 exerts a force on the chain 7 which is transmitted to the buffer 5 and serves to hold the buffer 5 in engagement with the side of the container.

Referring now to FIGS. 5 and 6 which show the towing attachment for connection to a fork lift or such conveyance, a base plate 9 is shown having fixed thereon a ball support platform 10 and located above the ball support platform is a support flange 11 for a holding down bar 13. Affixed to the ball support platform is the actual ball 12. Located on opposite sides of the base plate are two slots 14 to permit the use of bolts to affix the attachment to the fork, a portion of which designated 20 is illustrated in FIG. 6. Referring once again to FIG. 2, an upper ram 15 is provided which fits through the hole 16 in an arch which is shown as an A section or bracket R shown. As will be explained, the arch is for use when it is desired to load a container onto a truck.

When the container lifter is simply to be used with a fork lift and manoeuvred by it, it is attached to the front of the fork lift and secured thereto by the towing attachment as mentioned above, the towing attachment may be mounted on the fork lift by using slots 14 in conjunction with suitable fasteners. At this stage the lifting chains and dogs are hanging down. The container lifter is then manoeuvred into position around the container with both sets of sliding rams in the outward position to ensure sufficient clearance. The front of the frame is then lowered by suitable actuation of the fork lift to enable the lifting dogs to be engaged in the lower lifting positions (in the corners) of the container, and the sliding rams or buffers pushed into position inwardly to contact the container proper.

The front of the container is then raised by suitable actuation of the fork lift. Of course the dogs remain engaged in the container and the front sliding rams remain in position against the side of the container during this operation. When the front of the container has been raised sufficiently, the rear sliding rams or buffers are pushed against the container and the lifting dogs at the rear are engaged in the lower container lifting positions.

The front of the container is then lowered and the rear of the container raised by use of the fork lift. At this stage the base of the container is substantially horizontal and the container is ready to be moved. It is evident that the effective ground clearance of the front or rear of the container can be varied if desired by suitable operation of the fork lift.

It should be clear that whilst the container lifter described is designed for use with a $20' \times 8' \times 8'$ container, by varying the dimensions other containers of different sizes could be handled. Desirable dimensions for the container lifter described are:

Overall length: about 28′

Overall width: about 11′

Distance between centres of rear and front buffers: about 18′9″

Clearance between frame and wheels: about 3″

Distance between centres of wheel and front buffers: about 10′

Distance between centres of wheel and rear buffer: about 8′9″

In use I have had no difficulty in lifting and transporting a loaded $20' \times 8' \times 8'$ sea container using a $3\frac{1}{2}$ ton fork lift.

When it is desired to place the container on a truck the following procedure is followed, use being made of the upper rams 15 and the A section arches.

Firstly the container is placed on the lifter as previously described. Then the front is pushed down thereby raising the back and stands are inserted under the back. The sliding rams at the back are then pulled out and the front lifted up onto a stand. The front rams are then removed and the upper rams placed in the A bracket and the front lifted and the rear rams placed in the A bracket and the lifter is then levelled. The tray of a truck is then backed under the container, after removing the stands, and the container lowered onto the truck. This may be done by reversing the see-saw method—lifting the front by the front end loader until the rear of the container rests on the tray removing the rear rams and then lowering the front of the container and removing the front rams. The front rams may then be disconnected and the container trucked to its desired location.

The chassis may be made of any suitable material and may comprise a 10"×5" R.S.J. with the side and bottom welded so as to construct a beam section.

The container lifter is excellent for use on light capacity wharves and may be modified for heavy lifts. The container lifter may be made in kit form and assembled on site by bolting the various parts together and if desired followed by welding for added strength.

It should be mentioned that the sliding rams exert force against the sides of the container and act to hold the container firmly in a desired position in the frame of the device of the invention.

I claim:

1. Mobile cradle type container carrier comprising a U-shaped frame chassis having facing legs, at least one pair of wheels at the center portion of said legs with their axes extending transversely of the U-frame chassis, the legs enabling rocking of the chassis in a vertical plane about said axes, first coupling means on the chassis for articulate attachment to the front of a fork lift, and second coupling means carried by each end of each chassis leg for locking the chassis to the container, the chassis being movable by the fork lift to position the U-frame around the container with clearance between each leg and adjacent container side and being vertically rocked so as to bring the chassis at first to a position for locking first end lower container corner portions to one end of the chassis and thereafter, upon reversed rocking, to bring the chassis to a position for locking the opposite lower container corner portions to the opposite end of the chassis, each of said second coupling means comprising a sliding buffer (5) displaceable in a longitudinal direction so that one end of the the buffer engages a flat supporting surface portion of the container, a chain (7) having one end secured to the opposite end of said buffer, locking means (6) secured to the opposite end of said chain for locking engagement in an aperture in the lower corner portion of the container, the length of the chain being such that the container, when raised by the fork lift, tensions the chain and pushes and presses said buffer into contact with the container.

2. Container carrier according to claim 1, wherein the locking means (6) is a twist lock.

3. A container lifter for use with bulk handling freight containers of generally rectangular form, said lifter comprising a pair of parallel horizontally disposed frame arms joined by a cross-member to form a U-shaped frame chassis adapted to be arranged around three sides of a container to be lifted; a towing hitch on said cross-member adapted to be secured to a fork-lift truck, a wheel on each of said frame arms centrally disposed along the length thereof, thereby defining a central transverse axis about which the lifter can perform a see-sawing motion; a pair of sliding buffers on each of said frame arms disposed one at each end thereof, first ends of said buffers being engageable with side portions of the container; lengths of chains having first ends connected to the other ends of said buffers, and means connected to the other ends of said chains for engaging the container at a respective one of the four courners of the base thereof.

* * * * *